(12) United States Patent
Joshi et al.

(10) Patent No.: US 12,639,858 B2
(45) Date of Patent: May 26, 2026

(54) CODING OF DISPLACEMENTS BY USE OF CONTEXTS FOR VERTEX MESH (V-MESH)

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 18/447,191

(22) Filed: Aug. 9, 2023

(65) Prior Publication Data

US 2024/0095966 A1 Mar. 21, 2024

Related U.S. Application Data

(60) Provisional application No. 63/408,598, filed on Sep. 21, 2022, provisional application No. 63/442,890, filed on Feb. 2, 2023.

(51) Int. Cl.
*G06T 9/00* (2006.01)
*H04N 19/91* (2014.01)

(52) U.S. Cl.
CPC ............. *G06T 9/001* (2013.01); *H04N 19/91* (2014.11)

(58) Field of Classification Search
CPC ................................ G06T 9/001; H04N 19/91
See application file for complete search history.

(56) References Cited

U.S. PATENT DOCUMENTS

| | | | | |
|---|---|---|---|---|
| 6,028,608 A | * | 2/2000 | Jenkins | G06T 15/00 |
| | | | | 345/619 |
| 2021/0209813 A1 | * | 7/2021 | Hur | H04N 19/105 |
| 2021/0319581 A1 | * | 10/2021 | Hur | H04N 19/70 |
| 2023/0171431 A1 | * | 6/2023 | Oh | H04N 19/30 |
| | | | | 375/240.12 |
| 2023/0377208 A1 | * | 11/2023 | Akhtar | G06T 3/40 |
| 2024/0135596 A1 | * | 4/2024 | Akhtar | G06T 9/002 |
| 2024/0346707 A1 | * | 10/2024 | Akhtar | G06T 9/002 |

FOREIGN PATENT DOCUMENTS

WO WO-2022067782 A1 * 4/2022 ............. H04N 19/60

OTHER PUBLICATIONS

Wan, Shuai translation of WO 2022067782 A1 Sep. 30, 2020 (Year: 2020).*
WG 7, MPEG 3D Graphics and Haptics Coding, "V-Mesh Test Model v1", ISO/IEC JTC 1/SC 29/WG 7 N00404, Jul. 2022, 15 pages.
Mammou et al., "[V-CG] Apple's Dynamic Mesh Coding CfP Response", ISO/IEC JTC 1/SC 29/WG 7 m59281, Apr. 2022, 24 pages.

* cited by examiner

*Primary Examiner* — Zaihan Jiang

(57) ABSTRACT

An apparatus includes a communication interface and a processor operably coupled to the communication interface. The processor is configured to form a level of detail (LOD) signal corresponding to a displacement field. The processor is also configured to identify a current sample in the LOD signal. The processor is further configured to derive a context for the current sample in the LOD signal. In addition, the processor is configured to produce an output bitstream by encoding the LOD signal using the context.

20 Claims, 9 Drawing Sheets

300

330

SPEAKER(S)

325

RX PROCESSING CIRCUITRY

310

305

RF TRANSCEIVER

320

MICROPHONE

315

TX PROCESSING CIRCUITRY

I/O IF

345

SENSOR(S)

365

340

PROCESSOR(S)

350

INPUT

DISPLAY

355

360

MEMORY

OPERATING SYSTEM (OS)    361

APPLICATIONS    362

CODING OF DISPLACEMENTS BY USE OF CONTEXTS FOR VERTEX MESH (V-MESH)

CROSS-REFERENCE TO RELATED APPLICATION AND PRIORITY CLAIM

This application claims priority under 35 U.S.C. § 119(e) to U.S. Provisional Patent Application No. 63/408,598 filed on Sep. 21, 2022, and U.S. Provisional Patent Application No. 63/442,890 filed on Feb. 2, 2023, which are hereby incorporated by reference in their entirety.

TECHNICAL FIELD

This disclosure relates generally to multimedia devices and processes. More specifically, this disclosure relates to improved coding of displacement by use of context for V-MESH.

BACKGROUND

Three hundred sixty degree (360°) video and three dimensional (3D) volumetric video are emerging as new ways of experiencing immersive content due to the ready availability of powerful handheld devices such as smartphones. While 360° video enables immersive a "real life," "being-there" experience for consumers by capturing the 360° outside-in view of the world, 3D volumetric video can provide a complete six degree of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is three-dimensional (3D) in nature, such as point clouds or 3D polygonal meshes, can be used in the immersive environment.

SUMMARY

This disclosure provides improved coding of displacements by use of contexts for V-MESH.

In a first embodiment, an apparatus includes a communication interface and a processor operably coupled to the communication interface. The processor is configured to form a level of detail (LOD) signal corresponding to a displacement field. The processor is also configured to identify a current sample in the LOD signal. The processor is further configured to derive a context for the current sample in the LOD signal. In addition, the processor is configured to produce an output bitstream by encoding the LOD signal using the context.

In a second embodiment, a method includes forming a LOD signal corresponding to a displacement field. The method also includes identifying a current sample in the LOD signal. The method further includes deriving a context for the current sample in the LOD signal. In addition, the method includes producing an output bitstream by encoding the LOD signal using the context.

In a third embodiment, an apparatus includes a communication interface and a processor operably coupled to the communication interface. The processor is configured to form a compressed bitstream of a LOD signal corresponding to a displacement field encoded using a context. The processor is also configured to derive the context for a current sample in the LOD signal. The processor is further configured to output the LOD signal by decoding the compressed bitstream using the context.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

A point cloud is a set of 3D points along with attributes such as color, normal, reflectivity, point-size, etc. that represent an object's surface or volume. Point clouds are common in a variety of applications such as gaming, 3D maps, visualizations, medical applications, augmented reality, virtual reality, autonomous driving, multi-view replay, six degree of freedom (DoF) immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be transformed into traditional two-dimensional (2D) frames and that can be compressed and later be reconstructed and viewable to a user.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively.

Since point clouds and meshes contain a large amount of data, they require compression for efficient storage and transmission. This is particularly true for dynamic point clouds and meshes, which may contain 60 frames or higher per second.

Figure 1:
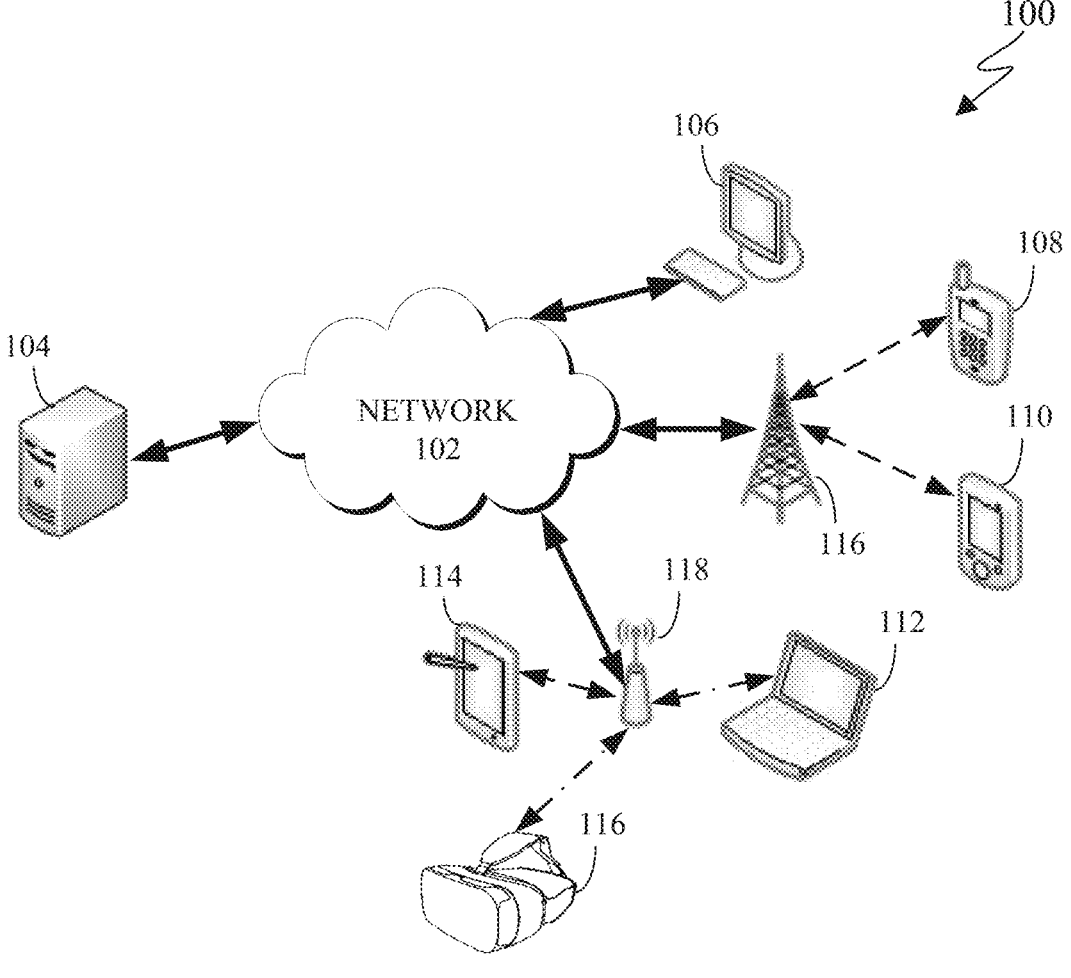
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder. In certain embodiments, the server 104 can use contexts for vertex mesh (V-mesh) to improve coding of displacements.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104. In certain embodiments, the client devices 106-116 can use contexts for vertex mesh (V-mesh) to improve coding of displacements.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
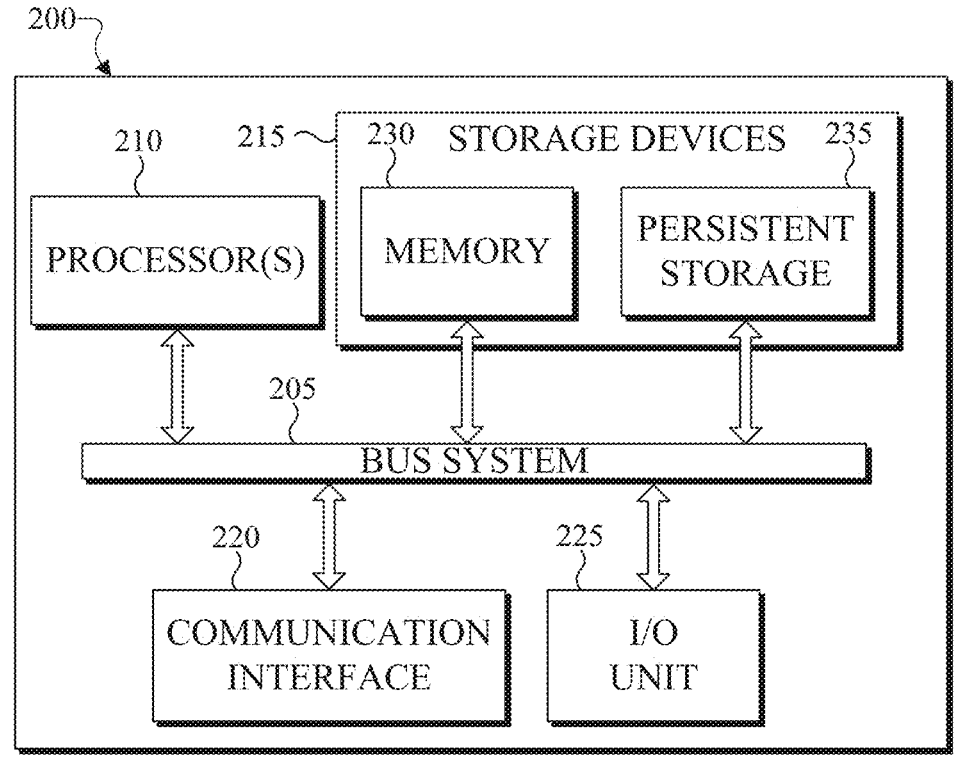
FIGS. 2 and 3 illustrate example electronic devices in accordance with an embodiment of this disclosure.
Figure 3:
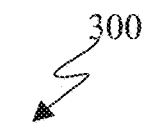

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding. In certain embodiments, the processor 210 can use contexts for vertex mesh (V-mesh) to improve coding of displacements.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can use contexts for vertex mesh (V-mesh) to improve coding of displacements.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
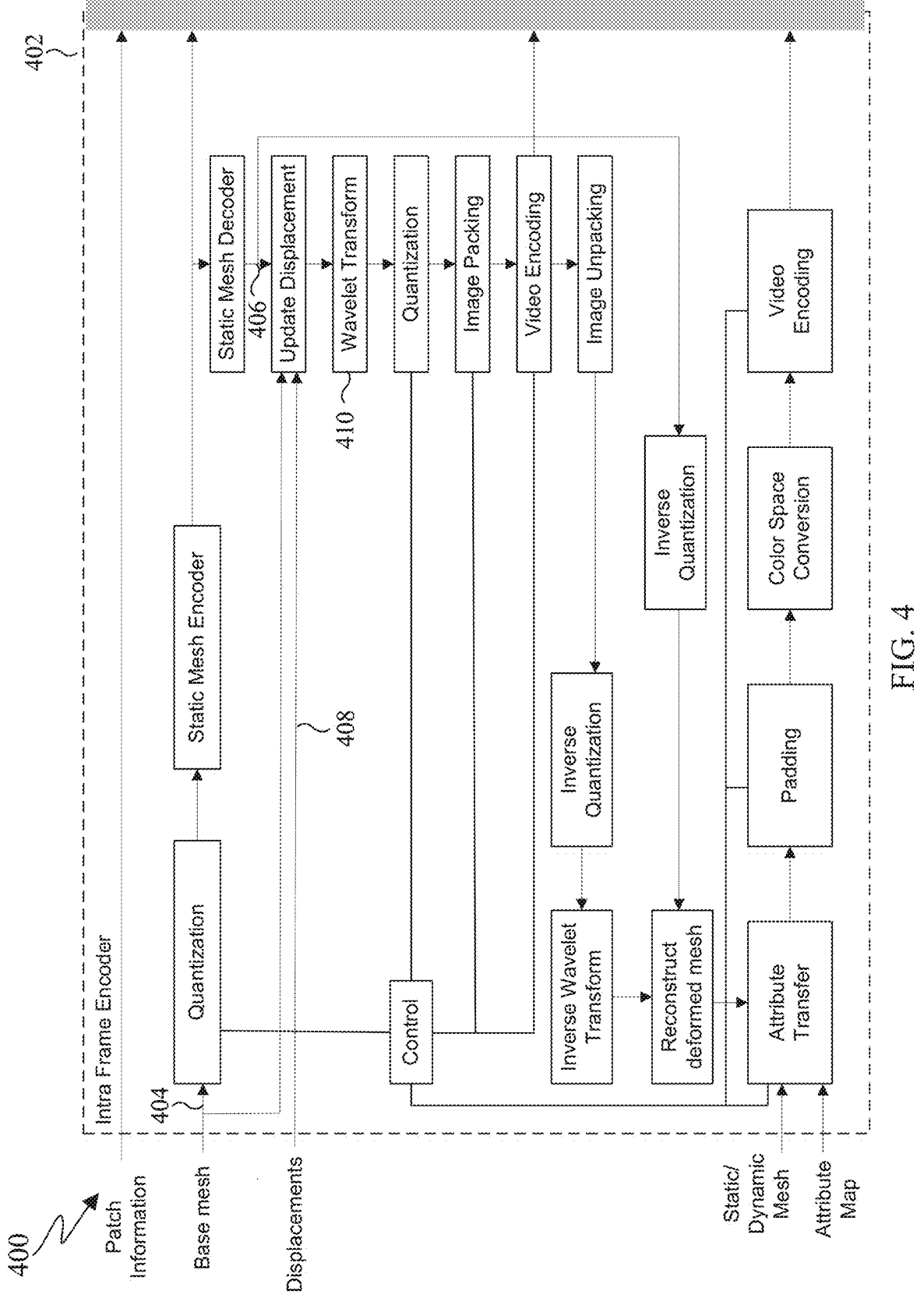
FIG. 4 illustrates a block diagram of an example intra frame encoding in accordance with an embodiment of this disclosure.

FIG. 4 illustrates an example intra-coding 400 of a mesh frame in accordance with this disclosure. The embodiment of the intra-coding 400 illustrated in FIG. 4 is for illustration only. FIG. 4 does not limit the scope of this disclosure to any particular implementation of a mesh frame.

As shown in FIG. 4, an intra coding 400 of a mesh frame using an intra-frame encoder 402 is provided. The intra-frame encoder 402 can be represented by the server 200 shown in FIG. 2 or the electronic device 300 shown in FIG. 3. The basic idea is that a base mesh 404, which typically has a smaller number of vertices compared to the original mesh, is created and compressed in either a lossy or lossless manner. The reconstructed base mesh 406 undergoes subdivision and then a displacement field between the original mesh and the subdivided reconstructed base mesh is calculated. In inter-coding of a mesh frame, the base mesh 404 is coded by sending vertex motions instead of compressing the base mesh directly. In either case, a displacement 408 is created. Each displacement 408 has three components, denoted by x, y, and z. These may be with respect to a canonical coordinate system or a local coordinate system where the x, y, and z represent the displacement 408 in local normal, tangent, and bi-tangent directions.

Let the number of 3-D displacement vectors in a displacement 408 of a mesh-frame be N. Let the displacement field be denoted by $d(i) = [d_x(i), d_y(i), d_z(i)]$, $0 \leq i < N$. In vmesh-v1.0, the displacement 408 undergoes one or more levels of wavelet transformation 410 to create level of detail (LOD) signals $d^k((i)$, $i = 0 \leq i < N^k$, $0 \leq k < numLOD$, where k denotes the index of the level of detail, $N^k$ denotes the number of samples in the level of detail signal at level k, and numLOD denotes the number of LODs. The LOD signals $d^k(i)$ are scalar quantized.

This disclosure pertains to methods for coding the quantized level of detail signals corresponding to the displacement 408. In vmesh-v1.0, the quantized LOD signals are packed into a 2D image/video, and are compressed losslessly by using an image or video encoder. However, it is possible to use another entropy coder such as asymmetric numeral systems (ANS) coder or a binary arithmetic entropy coder to code the quantized LOD signals. There may be other dependencies based on previous samples, across components, and across LODs that may be exploited.

Consider a level of detail signal $d^k(i)$, $i = 0 \leq i < N^k$, where $0 \leq k < numLOD$. Furthermore, consider coding the x-component of the signal at index i, that is $$d_x^k(i).$$

Due to coding a signal that is already quantized, $$d_x^k(i)$$

is assumed as an integer and satisfies, $$-M_x \leq d_x^k(i) \leq M_x.$$

Let the probability that $$d_x^k(i)$$

takes the value n be donated by p(n), $0 \leq p(n) \leq 1$, $-M_x \leq n \leq M_x$, which is referred to as the probability density function. Then the first order entropy for $$d_x^k,$$

denoted by $$E_x^k,$$

which can be represented by equation 1:

$$E_x^k = \sum_{n=-M_x}^{M_x} - p(n)\log_2(p(n)) \qquad (1)$$

When fixed arithmetic coding with a single context is used for coding $$d_x^k(i),$$

the number of bits required may be approximated by the first order entropy. The probability density function is assumed to be known to the decoder or explicitly coded at a small bit cost. Assuming that the displacement component $$d_x^k$$

is stationary and ergodic, use of adaptive arithmetic coding with a single context closely matches the number of bits needed for fixed arithmetic coding. In some embodiments, binary arithmetic coding can be used, which may require an additional step of binarization to convert the value of $$d_x^k$$

into bins.

In certain embodiments, the value of previous sample, $$d_x^k(i-1)$$

can be used as a context to code $$d_x^k(i).$$

In certain embodiments, for the $0^{th}$ sample, a previous sample can be assumed to have a value of 0. However, use any other value between $-M_x$ and $M_x$ is also possible. In one embodiment, adaptive arithmetic coding with $(2M_x+1)$ contexts is used. Consider the conditional probability of $$d_x^k(i)$$

taking a value n conditioned on the value of $$d_x^k(i-1)$$

being m be denoted by p(n/m). Then the conditional entropy of $$d_x^k(i)$$

conditional on $$d_x^k(i-1)$$

being m, denoted by $$CE_x^k(m),$$

which can be represented by equation 2:

$$CE_x^k(m) = \sum_{n=-M_x}^{M_x} - p(n/m)\log_2(p(n/m)) \qquad (2)$$

When arithmetic coding with the value of previous sample, $$d_x^k(i-1)$$

as a context is used for coding $$d_x^k(i),$$

the number of bits required may be approximated by equation 3:

$$CE_x^k = \sum_{m=-M_x}^{M_x} p(m)CE_x^k(m) \qquad (3)$$

Conditional entropies for coding displacement signals can be calculated and compared to first order entropies as well as to a number of bits needed for coding the displacement signals using a video codec (HEVC), as implemented in vmesh-v1.0 test model. Table 1 shows the results for two dynamic mesh sequences at rates R1 and R2. For the other bit-rates (such as R3, R4, and R5), the number of bits used for displacement coding can be very small so that the percentage improvement may not be very meaningful. For calculation of entropies, if all samples in a particular signal are identical, an entropy can be assumed to be 0. The results are for one frame, all-intra configuration.

TABLE 1

| Percentage improvement in compression efficiency for displacement coding using conditional entropy | | | |
| --- | --- | --- | --- |
| | Rate | Improvement in displacement coding (conditional entropy vs HEVC) | Improvement in displacement coding (conditional entropy vs first-order entropy) |
| Mitch | R1 | 19.70% | 4.50% |
| | R2 | 17.91% | 2.41% |
| Soldier | R1 | 15.05% | 5.56% |
| | R1 | 12.19% | 3.27% |

In certain embodiments, values of two or more previous samples may be used as a context instead of a single value of the previous sample. In certain embodiments, the context to code $$d_x^k(i)$$

may be derived based on the values of $$d_x^k(i-1) \text{ and } d_x^k(i-2).$$

But if $M_x$ is large, the number of contexts $(2M_x+1)*(2M_x+1)$ may become very large, which can affect coding efficiency. The coding efficiency can be affected because the context model for a context may not be able to adapt to the final distribution as the number of samples coded with that context may be very small when adaptive arithmetic coding is used. If fixed arithmetic coding is used, the overhead of transmitting the probability density functions for each context may become prohibitive. Hence, it may be desirable to use the following methods to reduce the number of contexts.

The $(2M_x+1)$ values can be mapped to a smaller subset. In certain embodiments, the absolute value may be used to derive the context. If values of two previous samples are used to derive the context, the number of contexts is reduced from $(2M_x+1)*(2M_x+1)$ to $(M_x+1)*(M_x+1)$ by using absolute values. In certain embodiments, the magnitude may be further clipped so that the number of context is reduced further. For example, the maximum magnitude can be clipped to 3 based on equation 4:

$$d_x^k(i-1) \rightarrow \min\left(\left|d_x^k(i-1)\right|, 3\right). \quad (4)$$

When values of two or more previous samples are used to derive the context, in one embodiment, the sum of absolute values, possibly clipped, may be used as a context. The context may depend on other components or level of detail signals instead of or in addition to previous samples from level of detail signal of a particular component. For example, if $$d_x^k(i)$$

and $$d_y^k(i)$$

have already been coded, the context for $$d_z^k(i)$$

may depend on the values of any of $$d_x^k(i), d_y^k(i), \text{ and } d_z^k(i-1)$$

or any combination thereof.

Although FIG. 4 illustrates a block diagram of an example intra frame encoding, various changes may be made to FIG. 4. For example, the number and placement of various components of the intra frame encoding 400 can vary as needed or desired. In addition, the intra frame encoding 400 may be used in any other suitable process and is not limited to the specific processes described above. In certain embodiments, only the first (x) component of the displacement may be created and coded and the other two components (y and z) may be assumed to be 0. In such a case, a flag may be signaled in the bitstream to indicate that the bitstream contains only data corresponding to the first (x) component and the other two components (y and z) should be assumed to be zero when decompressing and reconstructing the displacement 408.

Figure 5:
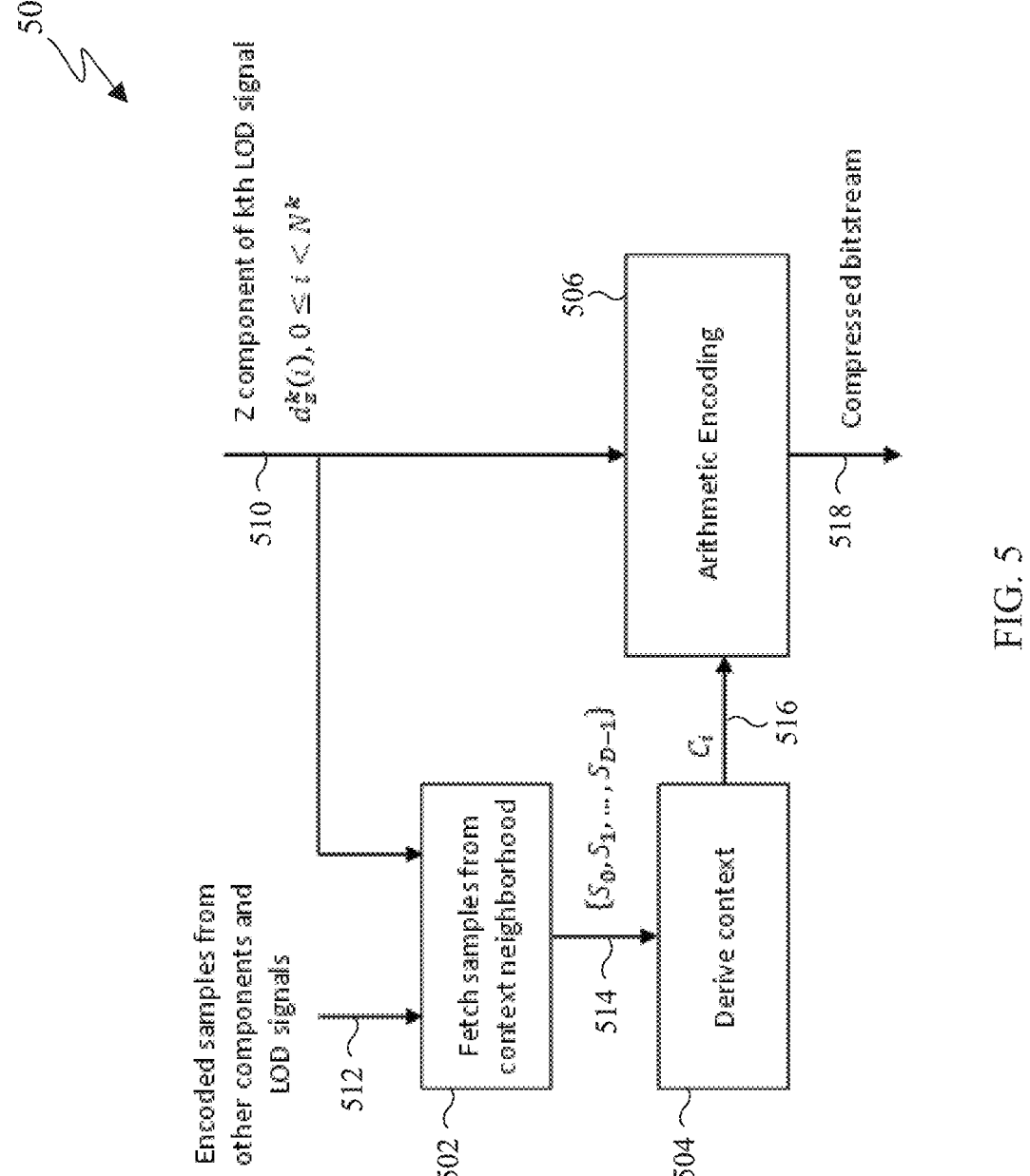
FIG. 5 illustrates a block diagram of an example detail signal encoding in accordance with an embodiment of this disclosure.

FIG. 5 illustrates a block diagram of an example detail signal encoding 500 in accordance with this disclosure. The embodiment of the detail signal encoding 500 illustrated in FIG. 5 is for illustration only. For ease of explanation, the detail signal encoding 500 of FIG. 5 is described as being performed using the electronic device 300 of FIG. 3. However, the detail signal encoding 500 may be used with any other suitable system and any other suitable electronic device.

As shown in FIG. 5, a detail signal encoding 500 can be performed for encoding $$d_z^k(i), 0 \leq i < N^k.$$

For each sample 510 in $$d_z^k,$$

the samples 512 from the context neighborhood can be fetched in step 502. The samples 512 may be already coded samples from a same level of detail signal component, previously coded level of detail signals, or components as described previously.

The context derivation block can derive the context value, $C_i$, 516 in step 504. The context value 516 can be derived in an inclusive range from 0 to (W−1). The context can be based on one or more samples from a context neighborhood. For example, the context can be based on a previous sample, more than one previous sample, another component of the current sample in the context neighborhood, and a value for the corresponding sample from a previous LOD signal.

The arithmetic encoding block can encode a current value $$d_z^k(i), 0 \le i < N^k$$

using the corresponding context, $C_i$, to produce the output bitstream 518 in step 506. The encoded current value can be transmitted over a compressed bitstream to an external device.

Although FIG. 5 illustrates a detail signal encoding 500, various changes may be made to FIG. 5. For example, while shown as a series of steps, various steps in FIG. 5 may overlap, occur in parallel, or occur any number of times.

Figure 6:
FIG. 6 illustrates a block diagram of an example detail signal decoding in accordance with an embodiment of this disclosure.
Figure 6:
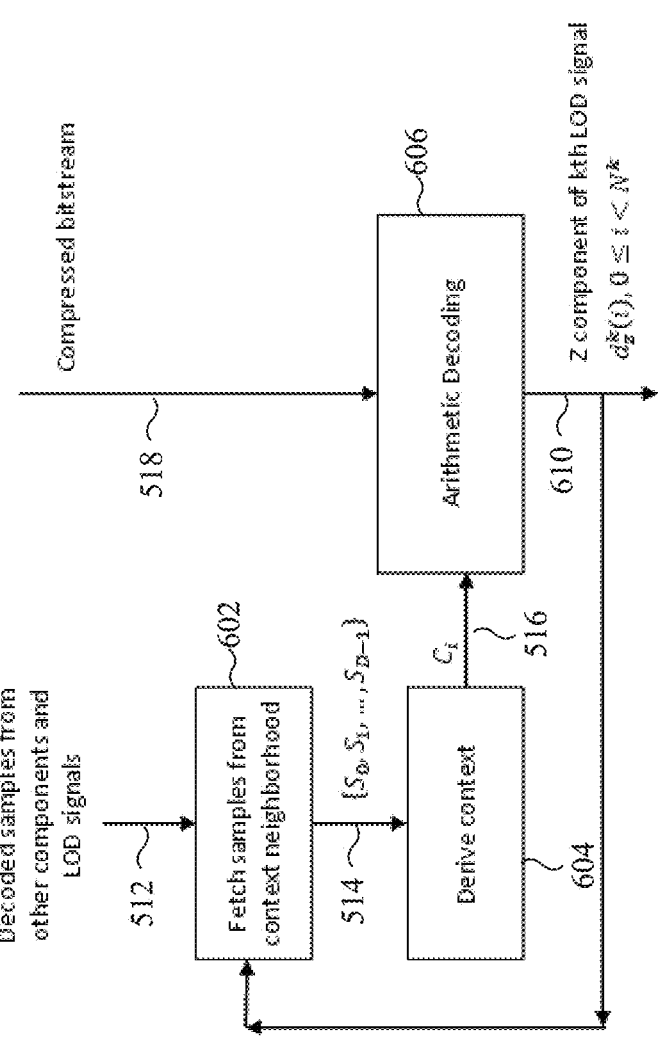

FIG. 6 illustrates a block diagram of an example detail signal decoding 600 in accordance with this disclosure. The embodiment of the detail signal decoding 600 illustrated in FIG. 6 is for illustration only. For ease of explanation, the detail signal decoding 600 of FIG. 6 is described as being performed using the electronic device 300 of FIG. 3. However, the detail signal decoding 600 may be used with any other suitable system and any other suitable electronic device.

As shown in FIG. 6, a detail signal decoding 600 can be performed for decoding $$d_z^k(i), 0 \le i < N^k.$$

For each i, $0 \le i < N^k$ in the compressed bitstream 518, the already decoded samples from the context neighborhood are fetched in step 602. These may be already decoded samples from the same level of detail signal component, previously coded level of detail signals or components as described previously.

Then the context derivation block derives the context value, $C_i$, 516 in step 604. The context value 516 can be derived in an inclusive range from 0 to (W−1).

The arithmetic decoding block decodes the z component 610 of the LOD signal, $$d_z^k(i), 0 \le i < N^k$$

using the input bitstream 518 and the corresponding context, $C_i$ 516 in step 606.

Although FIG. 6 illustrates a detail signal decoding 600, various changes may be made to FIG. 6. For example, while shown as a series of steps, various steps in FIG. 6 may overlap, occur in parallel, or occur any number of times.

Figure 7:
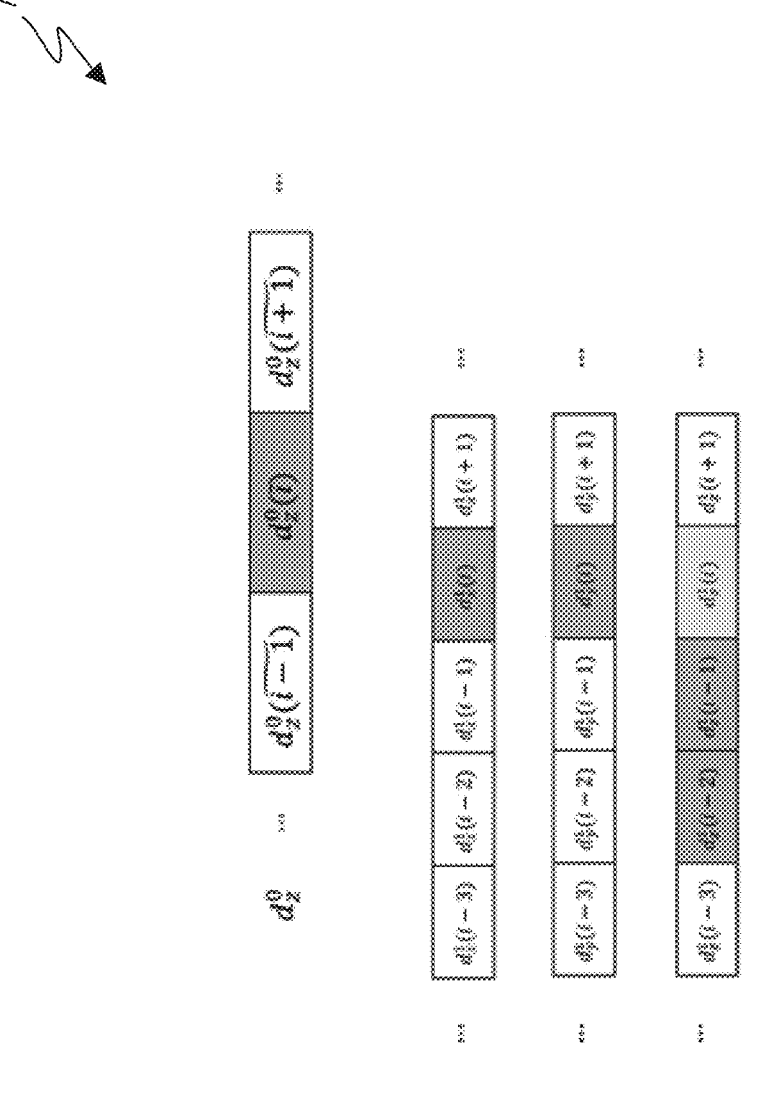
FIG. 7 illustrates an example lower level detail signal derivation in accordance with an embodiment of this disclosure.

FIG. 7 illustrates an example lower level detail signal derivation 700 in accordance with this disclosure. The embodiment of the lower level detail signal derivation 700 illustrated in FIG. 7 is for illustration only. FIG. 7 does not limit the scope of this disclosure to any particular implementation of an electronic device.

As shown in FIG. 7, level detail signal derivation 700 can be used to derive a context for a LOD signal. Typically, a lower level of detail has a smaller number of samples than a standard level of detail. Let is assume that when coding level of detail signal $$d_x^k$$

the lower levels of detail signal, $$d_x^{k-1}$$

has already been coded. For $$d_x^k(i),$$

let a corresponding sample in at level of detail (k−1) be $$d_x^{k-1}(t).$$

In certain embodiments, the values of any of $$d_x^{k-1}(t), d_x^k(i), d_y^k(i), d_z^k(i-1) \text{ and } d_z^k(i-2)$$

or any combination thereof may be used to derive the context for coding $$d_x^k(i).$$

The methods described above to reduce the number of contexts may be applied in this case as well. In certain embodiments, only the first (x) component of the displacement may be created and coded and the other two components (y and z) may be assumed to be 0. In such a case, a flag may be signaled in the bitstream to indicate that the bitstream contains only data corresponding to the first (x) component and the other two components (y and z) should be assumed to be zero when decompressing and reconstructing the displacement 408.

The method to reduce the number of contexts may be described more generally as follows. Let the context depend on D samples denoted by $S_0, S_1, \ldots, S_{D-1}$, which is denoted as a context neighborhood. The samples used for deriving the contexts may be already coded samples from the same level of detail signal component, previously coded level of detail signals, or components. Let a desired number of contexts be W and $\{S_0, S_1, \ldots, S_{D-1}\}$ denote all possible combination of values of the samples $S_0, S_1, \ldots, S_{D-1}$. Then the context is defined by a mapping from $\{S_0, S_1, \ldots, S_{D-1}\}$ to $\{0, 1, \ldots, (W-1)\}$. If some samples from the set $\{S_0, S_1, \ldots, S_{D-1}\}$ are unavailable, they may be assigned a default value such as 0.

If binary arithmetic coding is used, preforming binarization of $$d_x^k(i)$$

17

18 is necessary before applying binary arithmetic coding. There are many ways in which this could be accomplished. For example, binarization may be performed using unary coding, Golomb coding, or exponential coding or combination thereof. In such cases, in one embodiment, unary coded bins and the prefix bins for Golomb and exponential Golomb codes may be coded using the contexts as described above.

When looking at the statistics for quantized level of detail signals, the y and z components are entirely (or mostly) zero at higher levels of detail signals. In certain embodiments, a flag is sent for each component of each level of detail signal. A value of one indicates that all the samples are zero. Even when there are few non-zero samples, the flag may represent a good rate-distortion trade-off to signal that there are no non-zero samples present. Typically, the flag is unlikely to be 0 for x component and at level 0. In certain embodiments, the flag may not be sent at level 0 for any component and may never be sent for x component at any level.

In certain embodiments, x, y and z component values are decoded jointly as shown below. In certain embodiments, a flag (coded_flag_yz) is sent for each set of (x, y, z) values indicating whether the y and z values are zero or not. A value of 0 can indicate that y and z values are zero. A value of 1 can indicate that either y or z value is non-zero. In certain embodiments, when the coded_flag_yz is zero, the x component value may only be read from the bitstream, and y and z component values can be set to 0. In certain embodiments, when coded_flag_yz is one, the x component value can be first read from the bitstream and then a vector coded value yz can be read. In certain embodiments, the y value can be derived from the yz value by using a table lookup ytable that maps yz values to y values. In certain embodiments, the z value is derived from the yz value by using a table lookup ztable that maps yz values to z values. In certain embodiments, other logic can be used to derive y and z values from yz value. The num_sample_lod[k] is $N^k$, which can denote a number of samples in the level of detail signal at level k.

```
for(i=0; i<=num_sample_lod[k]; i++)
    read coded_flag_yz[i]
    if(coded_flag_yz[i])
        read x[i]
        read yz[i]
        y[i]=ytable[yz[i]]
        z[i]=ztable[yz[i]]
    else
        read x[i]
        y[i]=0
        z[i]=0
```

In certain embodiments, the syntax elements coded_flag_yz, x, y, z, yz can be arithmetically coded using m-ary or binary arithmetic coding.

Table 2 lists the bitrate savings over vmesh-1.0 over two example video meshes. The bitrate for the joint coding technique of FIG. 7 was estimated using entropy of the x, y, z symbols. Bit rate savings are observed at LOD levels 0, 1. For higher LODs and higher rate points, all the Y and Z components are usually 0 and hence joint coding is not applicable. The results are for one frame and All-Intra configuration.

TABLE 2

Bit-rate savings for the joint coding technique

|  | Rate | LOD level | Bitrate savings |
|---|---|---|---|
| Mitch | R1 | 0 | −1.8% |
|  | R1 | 1 | −0.9% |

TABLE 2-continued

Bit-rate savings for the joint coding technique

|  | Rate | LOD level | Bitrate savings |
|---|---|---|---|
|  | R2 | 0 | −0.8% |
|  | R2 | 1 | −0.9% |
| Soldier | R1 | 0 | −0.8% |
|  | R1 | 1 | −1.8% |
|  | R2 | 0 | −0.4% |
|  | R2 | 1 | −1.0% |

Although FIG. 7 illustrates a lower level detail signal derivation 700, various changes may be made to FIG. 7. For example, the number and placement of various components of the lower level detail signal derivation 700 can vary as needed or desired. In addition, the lower level detail signal derivation 700 may be used in any other suitable process and is not limited to the specific processes described above.

Figure 8:
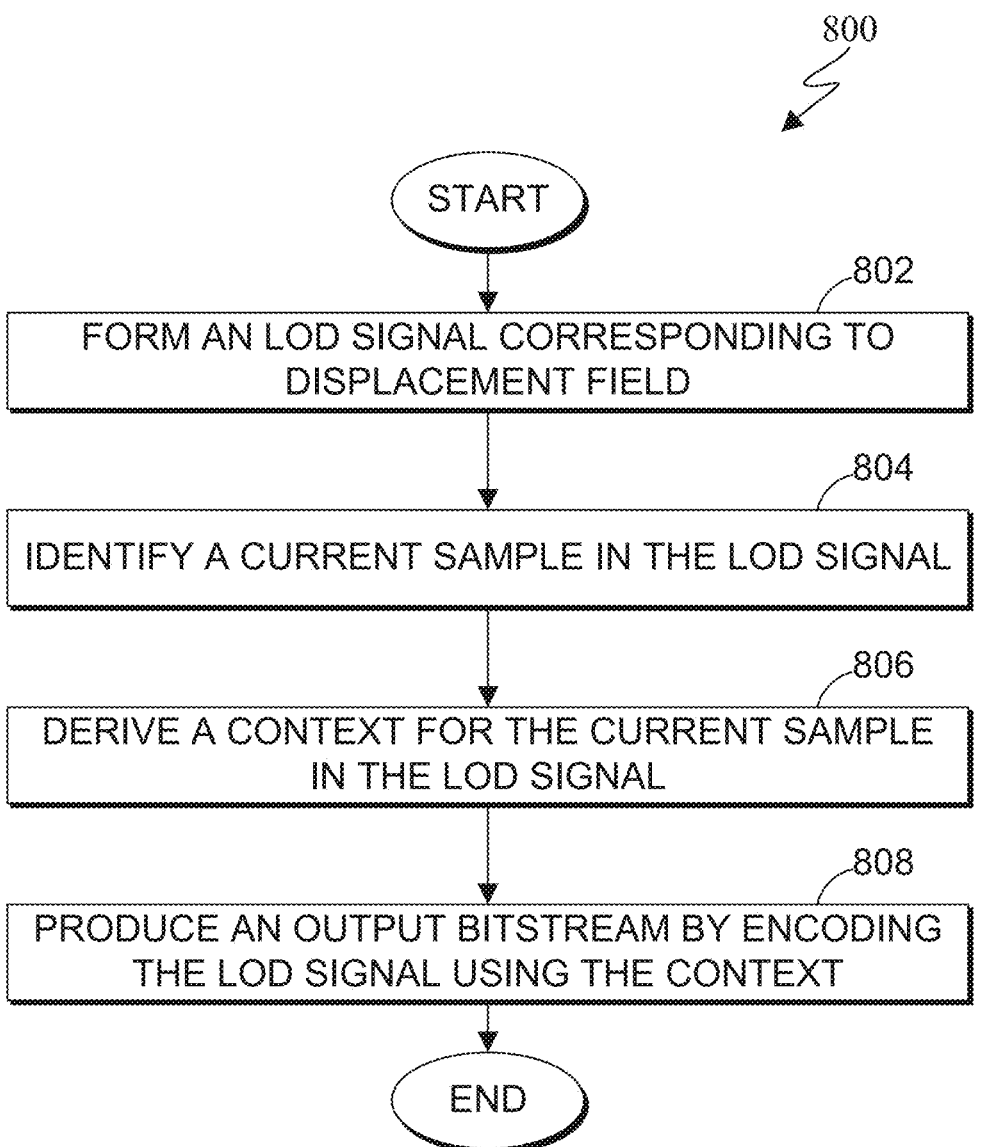
FIG. 8 illustrates an example method using a decoder for improved coding of displacements by use of contexts for V-MESH in accordance with an embodiment of this disclosure.

FIG. 8 illustrates an example method 800 using a decoder for improved coding of displacements by use of contexts for V-MESH according to this disclosure. For ease of explanation, the method 800 of FIG. 8 is described as being performed using the electronic device 300 of FIG. 3. However, the method 800 may be used with any other suitable system and any other suitable electronic device.

As shown in FIG. 8, the electronic device 300 can form a LOD signal corresponding to a displacement field at step 802. The LOD signal can be formed based on performing one or more levels of a wavelet transform 410 on displacements 408 of a mesh-frame.

The electronic device 300 can identify a current sample in the LOD signal at step 804. A sample is a value of a component for a LOD signal. A $0^{th}$ sample can have a value of 0.

The electronic device 300 can derive a context for the current sample in the LOD signal at step 806. In certain embodiments, one or more samples from a context neighborhood of the current sample in the LOD signal can be fetched for a current sample in the LOD signal. The one or more samples from the context neighborhood can be used to derive the context for the current sample in the LOD signal. When contexts of two previous samples are used to derive the context of the current sample, a number of contexts can be reduced from $(2M_x+1)*(2M_x+1)$ to $(M_x+1)*(M_x+1)$ by considering a magnitude of the previous samples.

In certain embodiments, a value for a previous sample in the context neighborhood can be identified for the current sample, where the previous sample is derived before the current sample in the LOD signal. The value of the previous sample can be used to determine the context of the current sample.

In certain embodiments, values for more than one previous samples in the context neighborhood can be identified for the current sample, where the more than one previous samples are derived before the current sample from the LOD signal. The values for the more than one previous sample can be used to determine the context of the current sample.

In certain embodiments, the LOD signal can have multiple components. A value for another component of the current sample in the context neighborhood can be identified for the current sample of a component of the LOD signal, where the value for another component of the current sample is derived before the current sample for the component of the LOD signal. The value for the other component of the current sample can be used to determine the context for the component of the current sample. A value for the corresponding sample from a previous LOD signal in the context neighborhood can be identified for the current sample from the LOD signal, where the corresponding sample of the previous LOD signal is derived before the current sample from the LOD signal. The value of the corresponding sample of the previous LOD signal can be used to determine the context for the current sample of the LOD signal.

The electronic device 300 can produce an output bitstream by encoding the LOD signal using the context at step 808. The output bitstream can be transmitted to an external device or to a storage on the electronic device 300.

Although FIG. 8 illustrates one example of a method 800 using a decoder for improved coding of displacements by use of contexts for V-MESH, various changes may be made to FIG. 8. For example, while shown as a series of steps, various steps in FIG. 8 may overlap, occur in parallel, or occur any number of times.

Figure 9:
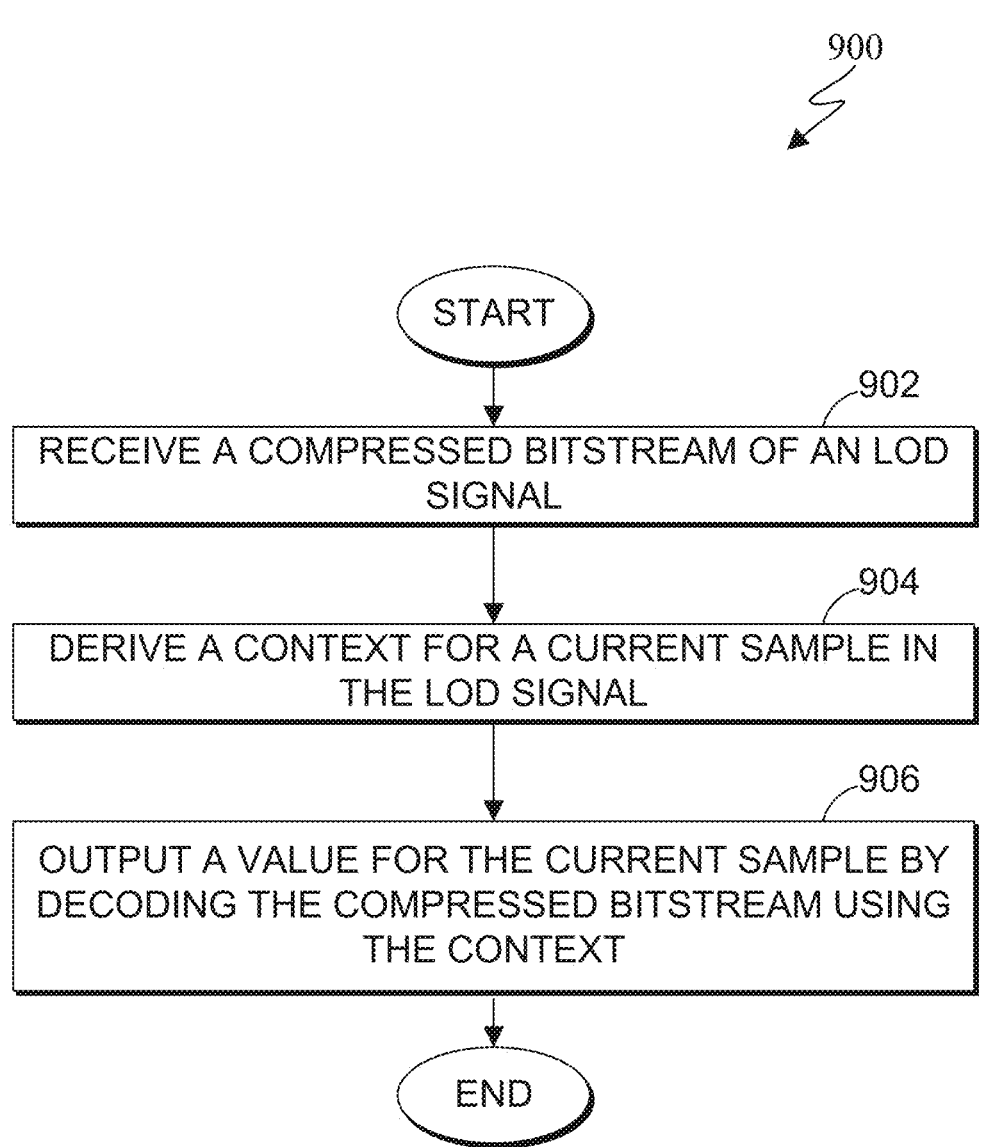
FIG. 9 illustrates an example method using an encoder for improved coding of displacements by use of contexts for V-MESH in accordance with an embodiment of this disclosure.

FIG. 9 illustrates an example method 900 using an encoder for improved coding of displacements by use of contexts for V-MESH according to this disclosure. For ease of explanation, the method 900 of FIG. 9 is described as being performed using the electronic device 300 of FIG. 3. However, the method 900 may be used with any other suitable system and any other suitable electronic device.

As shown in FIG. 9, the electronic device 300 can a compressed bitstream of a level of detail (LOD) signal corresponding to a displacement field encoded using a context at step 902. The compressed bitstream can be received from an external device or from an internal storage.

The electronic device 300 can derive the context for a current sample in the LOD signal at step 904. A sample is a value of a component for a LOD signal. A $0^{th}$ sample can have a value of 0.

In certain embodiments, one or more samples from a context neighborhood of the current sample in the LOD signal can be fetched for a current sample in the LOD signal. The one or more samples from the context neighborhood can be used to derive the context for the current sample in the LOD signal. When contexts of two previous samples are used to derive the context of the current sample, a number of contexts can be reduced from $(2M_x+1)*(2M_x+1)$ to $(M_x+1)*(M_x+1)$ by considering a magnitude of the previous samples.

In certain embodiments, a value for a previous sample in the context neighborhood can be identified for the current sample, where the previous sample is derived before the current sample in the LOD signal. The value of the previous sample can be used to determine the context of the current sample.

In certain embodiments, values for more than one previous samples in the context neighborhood can be identified for the current sample, where the more than one previous samples are derived before the current sample from the LOD signal. The values for the more than one previous sample can be used to determine the context of the current sample.

In certain embodiments, the LOD signal can have multiple components. A value for another component of the current sample in the context neighborhood can be identified for the current sample of a component of the LOD signal, where the value for another component of the current sample is derived before the current sample for the component of the LOD signal. The value for the other component of the current sample can be used to determine the context for the component of the current sample. A value for the corresponding sample from a previous LOD signal in the context neighborhood can be identified for the current sample from the LOD signal, where the corresponding sample of the previous LOD signal is derived before the current sample from the LOD signal. The value of the corresponding sample of the previous LOD signal can be used to determine the context for the current sample of the LOD signal.

The electronic device 300 can output a value for the current sample of the LOD signal by decoding the compressed bitstream using the context at step 906. The output value can be transmitted to an external device or to an internal storage.

Although FIG. 9 illustrates one example of a method 900 for using an encoder for improved coding of displacements by use of contexts for V-MESH, various changes may be made to FIG. 9. For example, while shown as a series of steps, various steps in FIG. 9 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
    a communication interface; and
    a processor operably coupled to the communication interface, the processor configured to:
        form a level of detail (LOD) signal corresponding to a displacement field;
        identify a current sample in the LOD signal;
        for the current sample in the LOD signal, fetch one or more samples from a context neighborhood of the current sample in the LOD signal;
        derive a context for the current sample in the LOD signal based on the one or more samples fetched from the context neighborhood of the current sample in the LOD signal;
        produce an output bitstream by encoding the LOD signal using the derived context; and
        when contexts of two previous samples are used to derive the context of the current sample, reduce a number of contexts by considering a magnitude of the two previous samples.

2. The apparatus of claim 1, wherein the one or more samples fetched from the context neighborhood of the current sample in the LOD signal include at least one of a previous sample, more than one previous sample, another component of the current sample, or a value for the corresponding sample from a previous LOD signal.

3. The apparatus of claim 1, wherein the processor is further configured to:
    for the current sample, identify a value for a previous sample in the context neighborhood, wherein the previous sample is derived before the current sample in the LOD signal; and
    determine the context of the current sample based on the value of the previous sample.

4. The apparatus of claim 1, wherein the processor is further configured to:
    for the current sample, identify values for more than one previous sample in the context neighborhood, wherein the more than one previous sample are derived before the current sample from the LOD signal; and determine the context of the current sample based on the values for the more than one previous sample.

5. The apparatus of claim 1, wherein, when the contexts of two previous samples are used to derive the context of the current sample, a number of contexts is reduced from $(2M_x+1)*(2M_x+1)$ to $(M_x+1)*(M_x+1)$.

6. The apparatus of claim 1, wherein:
the LOD signal has multiple components, and
the processor is further configured to:
for the current sample of a component of the LOD signal, identify a value for another component of the current sample in the context neighborhood, wherein the value for another component of the current sample is derived before the current sample for the component of the LOD signal; and
determine the context for the component of the current sample based on the value for the other component of the current sample.

7. The apparatus of claim 6, wherein elements of the LOD signal are arithmetically coded using binary arithmetic coding.

8. A method comprising:
forming a level of detail (LOD) signal corresponding to a displacement field;
identifying a current sample in the LOD signal;
for the current sample in the LOD signal, fetching one or more samples from a context neighborhood of the current sample in the LOD signal;
deriving a context for the current sample in the LOD signal based on the one or more samples fetched from the context neighborhood of the current sample in the LOD signal;
producing an output bitstream by encoding the LOD signal using the derived context; and
when contexts of two previous samples are used to derive the context of the current sample, reducing a number of contexts by considering a magnitude of the two previous samples.

9. The method of claim 8, wherein the one or more samples fetched from the context neighborhood of the current sample in the LOD signal include at least one of a previous sample, more than one previous sample, another component of the current sample, or a value for the corresponding sample from a previous LOD signal.

10. The method of claim 8, further comprising:
for the current sample, identifying a value for a previous sample in the context neighborhood, wherein the previous sample is derived before the current sample in the LOD signal; and
determining the context of the current sample based on the value of the previous sample.

11. The method of claim 8, further comprising:
for the current sample, identifying values for more than one previous sample in the context neighborhood, wherein the more than one previous sample are derived before the current sample from the LOD signal; and
determining the context of the current sample based on the values for the more than one previous sample.

12. The method of claim 8, further comprising:
when the contexts of two previous samples are used to derive the context of the current sample, a number of contexts is reduced from $(2M_x+1)*(2M_x+1)$ to $(M_x+1)*(M_x+1)$.

13. The method of claim 8, further comprising:
for the current sample of a component of the LOD signal with multiple components, identifying a value for another component of the current sample in the context neighborhood, wherein the value for another component of the current sample is derived before the current sample for the component of the LOD signal; and
determining the context for the component of the current sample based on the value for the other component of the current sample.

14. The method of claim 13, wherein elements of the LOD signal are arithmetically coded using binary arithmetic coding.

15. An apparatus comprising:
a communication interface; and
a processor operably coupled to the communication interface, the processor configured to:
receive a compressed bitstream of a level of detail (LOD) signal corresponding to a displacement field encoded using a context;
for a current sample in the LOD signal, fetch one or more samples from a context neighborhood of the current sample in the LOD signal;
derive the context for the current sample in the LOD signal based on the one or more samples from the context neighborhood of the current sample in the LOD signal;
output a value for the current sample of the LOD signal by decoding the compressed bitstream using the derived context; and
when contexts of two previous samples are used to derive the context of the current sample, reduce a number of contexts by considering a magnitude of the two previous samples.

16. The apparatus of claim 15, wherein the one or more samples fetched from the context neighborhood of the current sample in the LOD signal include at least one of a previous sample, more than one previous sample, another component of the current sample, or a value for the corresponding sample from a previous LOD signal.

17. The apparatus of claim 15, wherein the processor is further configured to:
for the current sample, identify a value for a previous sample in the context neighborhood, wherein the previous sample is derived before the current sample in the LOD signal; and
determine the context of the current sample based on the value of the previous sample.

18. The apparatus of claim 15, wherein the processor is further configured to:
for the current sample, identify values for more than one previous sample in the context neighborhood, wherein the more than one previous sample are derived before the current sample from the LOD signal; and
determine the context of the current sample based on the values for the more than one previous sample.

19. The apparatus of claim 15, wherein, when the contexts of two previous samples are used to derive the context of the current sample, a number of contexts is reduced from $(2M_x+1)*(2M_x+1)$ to $(M_x+1)*(M_x+1)$.

20. The apparatus of claim 15, wherein:
the LOD signal has multiple components, and
the processor is further configured to:
for the current sample of a component of the LOD signal, identify a value for another component of the current sample in the context neighborhood, wherein the value for another component of the current sample is derived before the current sample for the component of the LOD signal; and determine the context for the component of the current
sample based on the value for the other component
of the current sample.

* * * * *